(12) United States Patent
O'Sullivan et al.

(10) Patent No.: US 7,664,751 B2
(45) Date of Patent: Feb. 16, 2010

(54) VARIABLE USER INTERFACE BASED ON DOCUMENT ACCESS PRIVILEGES

(75) Inventors: Joseph O'Sullivan, San Francisco, CA (US); Siraj Khaliq, San Francisco, CA (US); Adam Smith, Mountain View, CA (US); Alexander MacGillivray, San Francisco, CA (US); Joe Sriver, Mountain View, CA (US)

(73) Assignee: Google Inc., Mountain View, CA (US)

( * ) Notice: Subject to any disclaimer, the term of this patent is extended or adjusted under 35 U.S.C. 154(b) by 275 days.

(21) Appl. No.: 10/953,496

(22) Filed: Sep. 30, 2004

(65) Prior Publication Data

US 2006/0074913 A1 Apr. 6, 2006

(51) Int. Cl.
*G06F 7/00* (2006.01)
*G06F 7/04* (2006.01)

(52) U.S. Cl. .............................................. 707/9; 726/27

(58) Field of Classification Search ...................... 707/9, 707/10, 5; 726/9, 17, 4, 27; 345/423; 713/1
See application file for complete search history.

(56) References Cited

U.S. PATENT DOCUMENTS

| | | | | |
|---|---|---|---|---|
| 5,276,901 | A * | 1/1994 | Howell et al. | 707/9 |
| 5,598,557 | A * | 1/1997 | Doner et al. | 707/5 |
| 5,634,012 | A | 5/1997 | Stefik et al. | |
| 5,892,900 | A * | 4/1999 | Ginter et al. | 726/26 |
| 5,930,801 | A * | 7/1999 | Falkenhainer et al. | 707/103 R |
| 6,122,741 | A * | 9/2000 | Patterson et al. | 726/17 |
| 6,237,099 | B1 * | 5/2001 | Kurokawa | 726/4 |
| 6,292,798 | B1 * | 9/2001 | Dockter et al. | 707/9 |
| 6,308,273 | B1 * | 10/2001 | Goertzel et al. | 726/9 |
| 6,314,425 | B1 * | 11/2001 | Serbinis et al. | 707/10 |
| 6,516,315 | B1 * | 2/2003 | Gupta | 707/9 |
| 6,578,037 | B1 * | 6/2003 | Wong et al. | 707/10 |
| 6,671,805 | B1 * | 12/2003 | Brown et al. | 713/176 |
| 6,720,965 | B1 * | 4/2004 | Hirosawa et al. | 345/423 |
| 6,807,534 | B1 * | 10/2004 | Erickson | 705/51 |
| 6,839,843 | B1 * | 1/2005 | Bacha et al. | 713/176 |
| 6,971,017 | B2 * | 11/2005 | Stringer et al. | 713/182 |

(Continued)

FOREIGN PATENT DOCUMENTS

WO WO 03/096179 11/2003

OTHER PUBLICATIONS

Joseph K. O'Sullivan, Co-pending U.S. Appl. No. 10/948,734, entitled "Image Distortion for Content Security", filed Sep. 22, 2004.

(Continued)

*Primary Examiner*—Shahid A Alam
*Assistant Examiner*—Joshua Bullock
(74) *Attorney, Agent, or Firm*—Harrity & Harrity, LLP

(57) ABSTRACT

Users may be presented with different viewing interfaces for a document based on a combination of factors relating to display rights possessed for the document and user specific information. In one implementation, the user's location is used to determine portions of the document that can be displayed to the user. More particularly, access privileges to a document for a user are determined based on geographical location information of the user and based on access rights possessed for the document. Portions of the document may then be formatted for display to the user based on the determined access privileges.

22 Claims, 11 Drawing Sheets

U.S. PATENT DOCUMENTS 6,990,492 B2 * 1/2006 Gupta ............................ 707/9
7,020,663 B2 * 3/2006 Hay et al. ................. 707/104.1
7,051,196 B2 * 5/2006 Angelo et al. ................... 713/1
7,133,845 B1 * 11/2006 Ginter et al. ................... 705/51
7,461,158 B2 * 12/2008 Rider et al. ................. 709/229
2004/0139327 A1 * 7/2004 Brown et al. ................ 713/176

OTHER PUBLICATIONS

Alma W. Whitten et al., Co-pending U.S. Appl. No. 10/956,564, entitled "Variably Controlling Access to Content", filed Oct. 1, 2004.

* cited by examiner

CHAPTER I

YOU don't know about me without you have read a book by the name of The Adventures of Tom Sawyer; but that ain't no matter. That book was made by Mr. Mark Twain, and he told the truth, mainly. There was things which he stretched, but mainly he told the truth. That is nothing. I never seen anybody but lied one time or another, without it was Aunt Polly, or the widow, or maybe Mary. Aunt Polly -- Tom's Aunt Polly, she is -- and Mary, and the Widow Douglas is all told about in that book, which is mostly a true book, with some stretchers, as I said before.

Now the way that the book winds up is this: Tom and me found the money that the robbers hid in the cave, and it made us rich. We got six thousand dollars apiece -- all gold. It was an awful sight of money when it was piled up. Well, Judge Thatcher he took it and put it out at interest, and it fetched us a dollar a day apiece all the year round -- more than a body could tell what to do with. The Widow Douglas she took me for her son, and allowed she would sivilize me; but it was rough living in the house all the time, considering how dismal regular and decent the widow was in all her ways; and so when I couldn't stand it no longer I lit out. I got into my old rags and my sugar-hogshead again, and was free and satisfied. But Tom Sawyer he hunted me up and said he was going to start a band of robbers, and I might join if I would go back to the widow and be respectable. So I went back.

▼ Page 10 ▲ ~ 815

810

800

FRONT COVER
TOC
BACK COVER
PAGE ☐

GEORGE C. MARSHALL

*former U.S. Secretary of State*
SPEAKING AT HARVARD UNIVERSITY JUNE 5, 1947

I need not tell you, gentlemen, that the world situation is very serious. That must be apparent to all intelligent people. I think one difficulty is that the problem is one of such enormous complexity that the very mass of facts presented to the public by press and radio make it exceedingly difficult for the man in the street to reach a clear appraisement of the situation. Furthermore, the people of this country are distant from the troubled areas of the earth and it is hard for them to comprehend the plight and consequent reactions of the long-suffering peoples, and the effect of those reactions on their governments in connection with our efforts to promote peace in the world.

In considering the requirements for the rehabilitation of Europe the physical loss of life, the visible destruction of cities, factories, mines and railroads was correctly estimated, but it has become obvious during recent months that this visible destruction was probably less serious than the dislocation of the entire fabric of European economy. For the past ten years conditions have been highly abnormal. The feverish preparation for war and the more feverish maintenance of the war effort engulfed all aspects of national economies. Machinery has fallen into disrepair or is entirely obsolete. Under the arbitrary and destructive Nazi rule, virtually every possible enterprise was geared into the German war machine. Long-standing commercial ties, private institutions, banks, insurance companies and shipping companies disappeared, through loss of capital, absorption through nationalization or simple destruction.

FRONT COVER
TOC
BACK COVER
PAGE ☐

HARNESSING THE RAGE BY DR. BRUCE BANNER

EXCERPT FROM HARNESSING THE RAGE

109 REFERENCES TO MEMORY IN THIS DOCUMENT. THREE VIEWABLE EXCERPTS AVAILABLE.

PAGE 5 did occur when he was required to process digits during the delay; the more demanding the processing, the greater the mistakes. Dale (1973) has studied memory for the location of a dot in a field 1 foot square. The field was illuminated from memory, with the dot presented as a shadow on a sheet of paper laid over the field. After

PAGE 15 were more likely to report (wrongly) that glass was broken. The most extreme view of the role of language in visual memory is represented by the linguistic relativity hypothesis, which stems from the work of the linguist Benjamin Lee Whorf. Whorf (1956) argues that language is not simply a way of expressing our view of

PAGE 28

The time course is very different from that observed with iconic memory which would in any case have been masked in this situation by the visually presented interpolated digits.
It might be argued, however, that a system which handles the retention of something as basic as the location of a single dot may

FIG. 10

VARIABLE USER INTERFACE BASED ON DOCUMENT ACCESS PRIVILEGES

BACKGROUND

A. Field of the Invention

Systems and methods described herein relate to data formatting and presentation and, more particularly, to techniques for presenting textual and graphical material.

B. Description of Related Art

Modern computer networks, and in particular, the Internet, have made large bodies of information widely and easily available. Free Internet search engines, for instance, index many millions of web documents that are linked to the Internet. A user connected to the Internet can enter a simple search query to quickly locate web documents relevant to the search query.

One category of content that is not widely available on the Internet, however, are the more traditional printed works of authorship, such as books and magazines. Before presenting this type of digital content to users, the content may first be scanned using an optical scanner. Once scanned, optical character recognition (OCR) may be used to convert text in the scanned digital images of the pages of the content to a searchable digital form.

When transmitting the scanned/OCR'ed version of the content (e.g., books or magazines) to users, the content provider may only be able to lawfully provide certain portions of the content to the users. For example, the content provider may provide certain books that are in the public domain and other documents for which the content provider does not have full legal rights. Accordingly, the portions of the book that the content provider chooses to provide to the users may vary.

SUMMARY OF THE INVENTION

According to one aspect, a method includes determining access privileges to a document for a user based on geographical location information of the user and based on access rights possessed for the document. The method further includes formatting portions of the document for display to the user based on the determined access privileges and transmitting the formatted portions of the document to the user.

According to another aspect, a method includes receiving a request for a document from a user, receiving information relating to the user, and determining viewable portions of the document, as governed by copyright laws, based on the information relating to the user. The method further includes making available the viewable portions of the document to the user.

According to yet another aspect, a system includes a search engine configured to receive search queries and return links to documents relevant to the search queries. The system further includes a document browsing component configured to, in response to requests for one or more of the documents relevant to the search query, determine access privileges to the one or more of the documents on a per-user basis based on geographical location information of the user. The document browsing component additionally transmits portions of the one or more of the documents permitted by the determined access privileges to the user.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 8 is a diagram of an exemplary document interface presented to a user that requests a document for which full access privileges were determined;

FIG. 9 is a diagram of an exemplary document interface presented to a user that requests a document for which partial access privileges were determined;

FIG. 10 is a diagram of an exemplary document interface presented to a user that requests a document for which restricted access privileges were determined.

DETAILED DESCRIPTION

The following detailed description of the invention refers to the accompanying drawings. The detailed description does not limit the invention.

Overview

Figure 1:
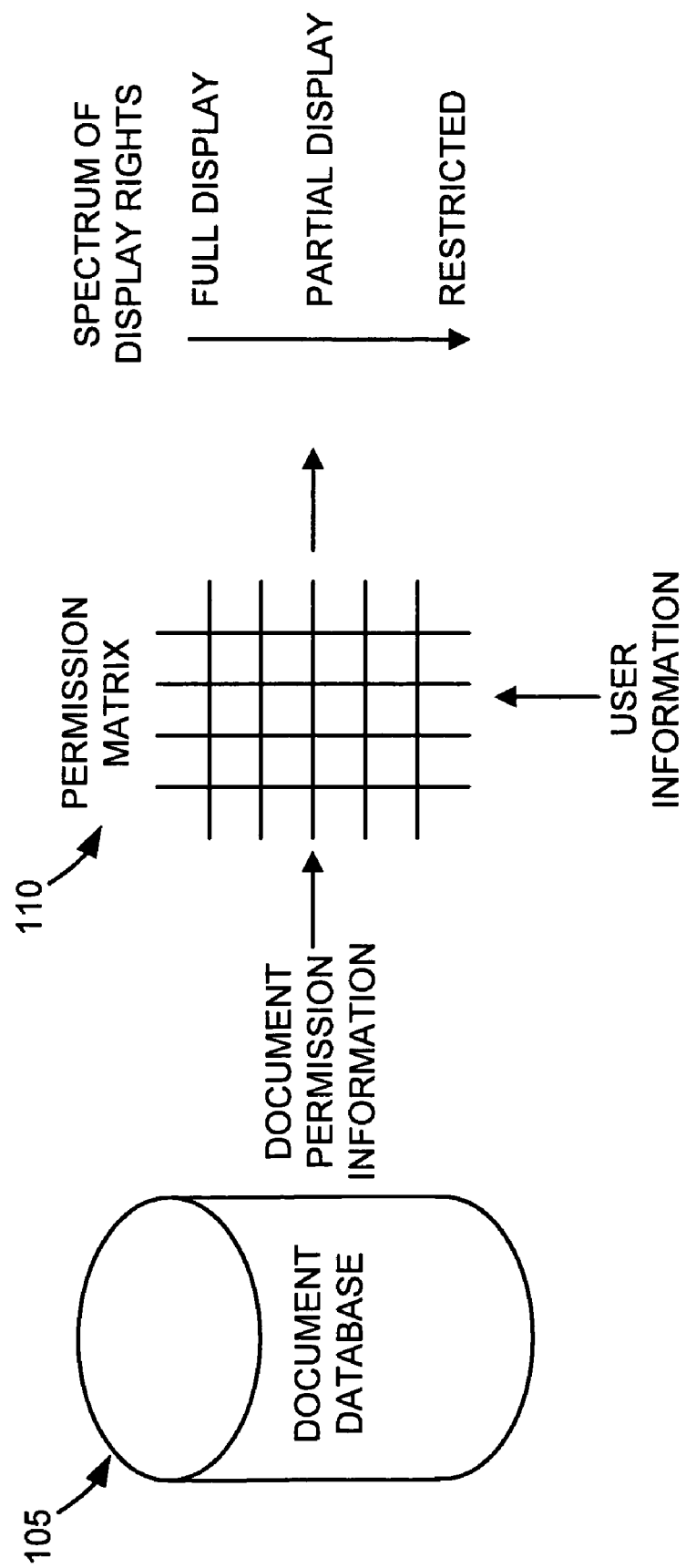
FIG. 1 is a diagram illustrating general concepts consistent with aspects of the invention.

FIG. 1 is a diagram illustrating general concepts consistent with aspects of the invention. A document database 105 may store a number of documents, such as books, magazines, or catalogs, that are made electronically available to end users. For example, database 105 may function in the context of an on-line printed document search engine or repository.

The ability to make the documents in database 105 available to the end users may be limited by the display rights possessed by the content provider (i.e., the operator of database 105). Copyright laws, business choices, or contractual restrictions may limit what is desired to be provided to the end users. The portions of the documents in database 105 that can be shown to a particular end user may be determined based on a number of factors, such as: (1) the location of the user (e.g., users in different countries/legal jurisdictions may be subject to different copyright requirements), (2) the permissions that the content provider has for the document being requested, (3) the type of content, and (4) the user's security status or state (e.g., whether the user is a registered user of a particular web site or a member of a particular group).

Consistent with aspects of the invention, users may be presented with different viewing interfaces each designed to present the available portions of the document, such as the portions determined based on the above-listed factors. The intersection of these factors can be conceptualized as permission matrix 110. The output of permission matrix 110 defines the spectrum of display rights available to the particular user. For a public domain document, for example, the display rights may be "full display," indicating that the entire document can be shown to the users. Other document/end user combinations may correspond to a lower level of display rights, down to as low as "restricted" viewing, which may correspond to a minimum viewing permission.

Exemplary System Overview

Figure 2:
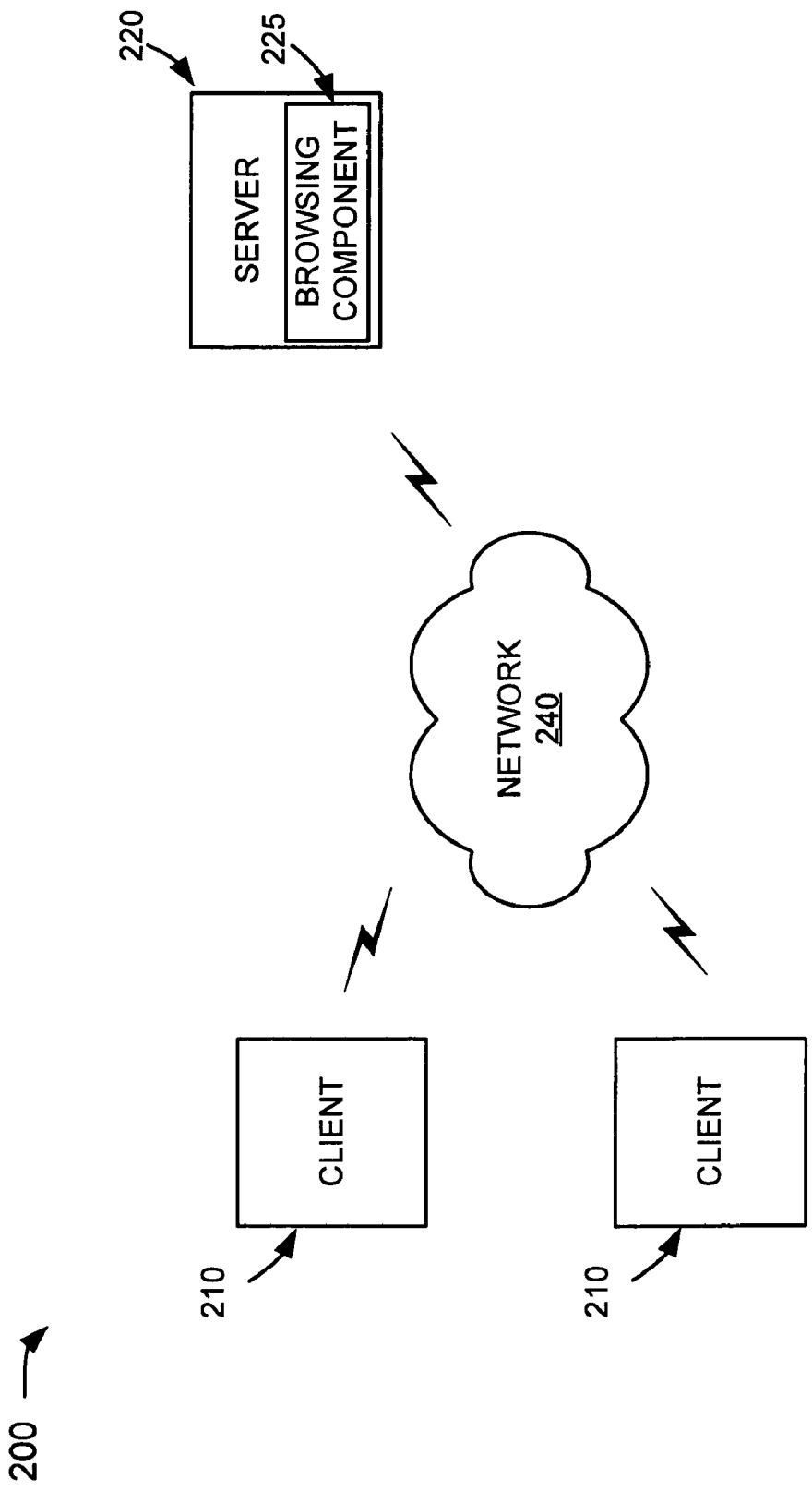
FIG. 2 is an exemplary diagram of a network.

FIG. 2 is an exemplary diagram of a system 200 in which concepts consistent with the principles of the invention may be implemented. System 200 may include multiple clients 210 connected to a server 220 via a network 240. Network 240 may include a local area network (LAN), a wide area network (WAN), a telephone network, such as the Public Switched Telephone Network (PSTN), an intranet, the Internet, or a combination of networks. Two clients 210 and one server 220 have been illustrated as connected to network 240 for simplicity. In practice, there may be more clients and/or servers. Also, in some instances, a client may perform one or more functions of a server and a server may perform one or more functions of a client.

A client 210 may include a device such as a wireless telephone, a personal computer, a personal digital assistant (PDA), a lap top, or another type of computation or communication device, a thread or process running on one of these devices, and/or an object executable by one of these devices. Server 220 may include a server device that processes, searches, and/or maintains documents and images in a manner consistent with the principles of the invention. Clients 210 and server 220 may connect to network 240 via wired, wireless, or optical connections.

Server 220 may include a document browsing component 225 that transmits images corresponding to documents, such as image pages of books, magazines, or catalogs, to clients 210. In addition to transmitting images of the pages of the documents, document browsing component 225 may provide information representing the text contained on the pages, such as ASCII text characters corresponding to the documents' pages. These documents may be gathered by document browsing component 225 in a number of ways, such as by optically scanning the documents or by receiving the documents from a third party, etc.

In one implementation, document browsing component 225 may include, or be coupled with, a search engine that allows clients to search a database of the documents via textual search queries.

Exemplary Client/Server Architecture

Figure 3:
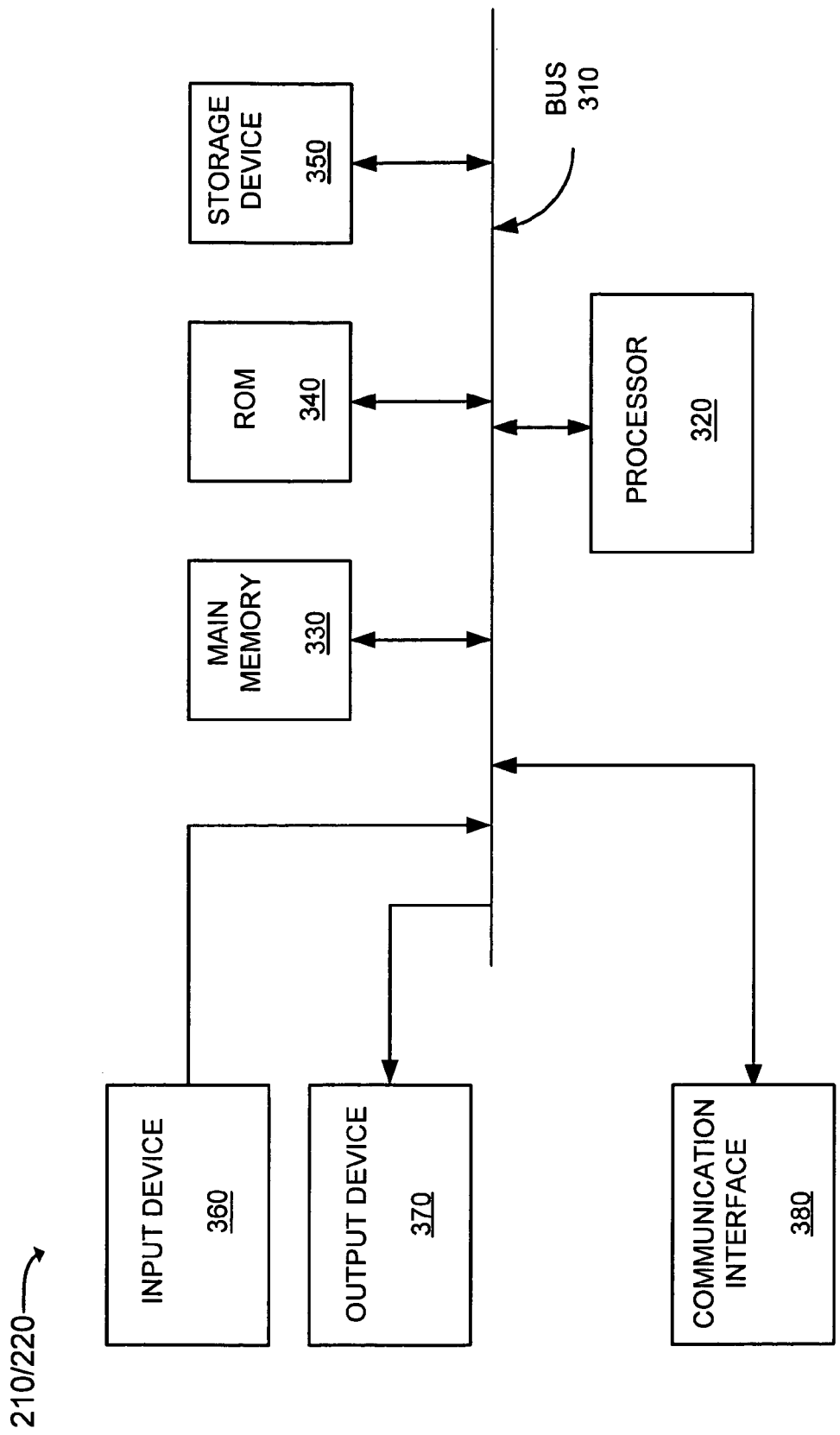
FIG. 3 is an exemplary diagram of a client or server shown in FIG. 2.

FIG. 3 is an exemplary diagram of a client 210 or server 220. Client/server 210/220 may include a bus 310, a processor 320, a main memory 330, a read only memory (ROM) 340, a storage device 350, an input device 360, an output device 370, and a communication interface 380. Bus 310 may include conductors that permit communication among the components of client/server 210/220.

Processor 320 may include conventional processors, microprocessors, or processing logic that interpret and execute instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device 360 may include one or more conventional mechanisms that permit a user to input information to client/server 210/220, such as a keyboard, a mouse, a pen, voice recognition and/or biometric mechanisms, etc. Output device 370 may include one or more conventional mechanisms that output information to the user, including a display, a printer, a speaker, etc. Communication interface 380 may include any transceiver-like mechanism that enables client/server 210/220 to communicate with other devices and/or systems. For example, communication interface 380 may include mechanisms for communicating with another device or system via a network, such as network 240.

Server 220, consistent with the principles of the invention, may implement additional document browsing component 225. Document browsing component 225 may be stored in a computer-readable medium, such as memory 330. A computer-readable medium may be defined as one or more physical or logical memory devices and/or carrier waves.

The software instructions defining document browsing component 225 may be read into memory 330 from another computer-readable medium, such as data storage device 350, or from another device via communication interface 380. The software instructions contained in memory 330 may cause processor 320 to perform processes that will be described later. Alternatively, hardwired circuitry or other logic may be used in place of, or in combination with, software instructions to implement processes consistent with the invention. Thus, implementations consistent with the principles of the invention are not limited to any specific combination of hardware circuitry and software. Additionally, multiple computing devices may function together to implement the functionality of a single server 220 or document browsing component 225.

Operation of Document Browsing Component 225

Figure 4:
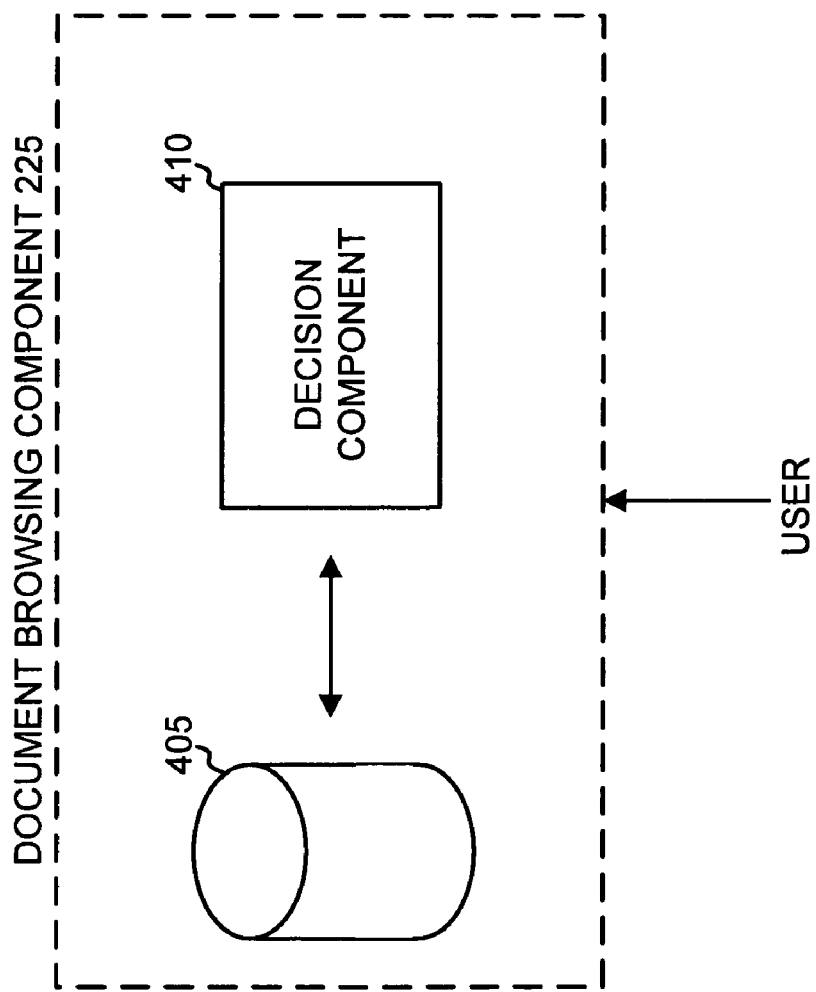
FIG. 4 is a diagram conceptually illustrating the document browsing component shown in FIG. 2.

FIG. 4 is a diagram conceptually illustrating document browsing component 225. Document browsing component 225 may include a document database 405 and a decision component 410. Database 405 may store documents and information related to the documents. Decision component 410 may generally decide which portions of the documents in database 405 may be transmitted to users requesting the documents. As previously mentioned, this decision may be based on a number of factors, such as the copyright-based or permission-based rights associated with the document.

Figure 5:
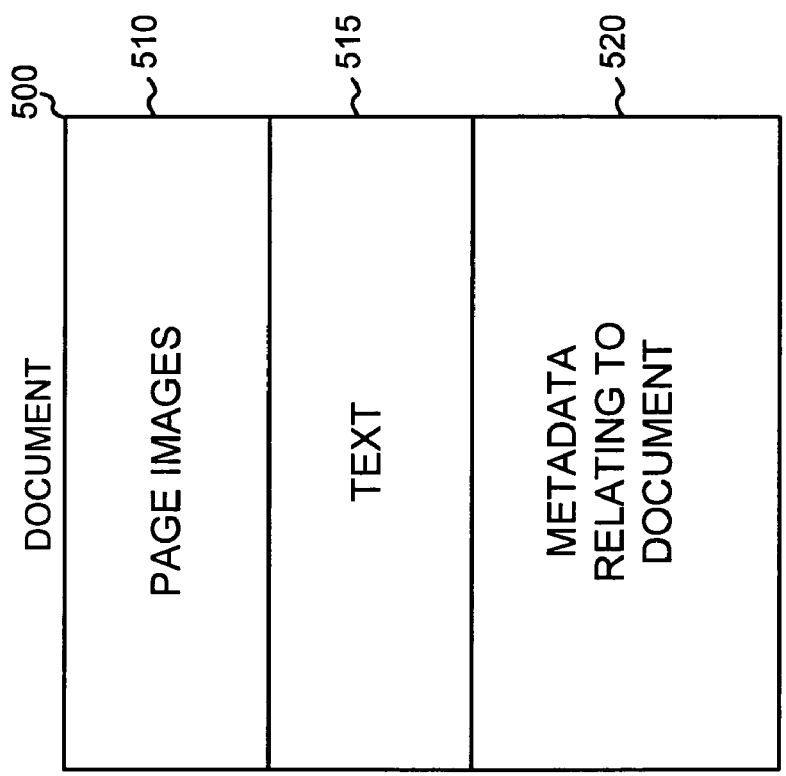
FIG. 5 is a diagram illustrating portions of an exemplary document stored in the database shown in FIG. 4.

As mentioned, database 405 may store documents and information related to the documents. FIG. 5 is a diagram illustrating portions of an exemplary document 500 stored in database 405. The information defining document 500 may include images 510 of pages of the document, text 515 of the document, and metadata 520 relating to the document. In some implementations, images 510 or text 515 may not be present. That is, a document 500 may include either page images 510 or text 515.

Images 510 may include images of the pages of the document. By storing images 510, users wishing to view the document can see the document in the form that the document was originally printed. The images may be obtained, for example, by optically scanning each page of the document or by obtaining the images from the publisher, author, or another source.

Text 515 may include the text in document 500 in a machine-readable format. For example, text 515 may include an ASCII (American Standard Code for Information Interchange) representation of the text of document 500. Text 515 may be obtained in a number of ways, such as by performing OCR on images 510, by manually typing the text of the document, or by obtaining the text from the publisher, author, or another source.

Metadata 520 may include additional information relating to document 500. For example, metadata 520 may include publisher information, the ISBN of document 500 (when document 500 is a document, such as a book, that has an ISBN), summary information describing document 500, links to additional information about document 500 (such as Web links), etc. Consistent with an aspect of the invention, metadata 520 may include information relating to access rights associated with or possessed for document 500.

Figure 6:
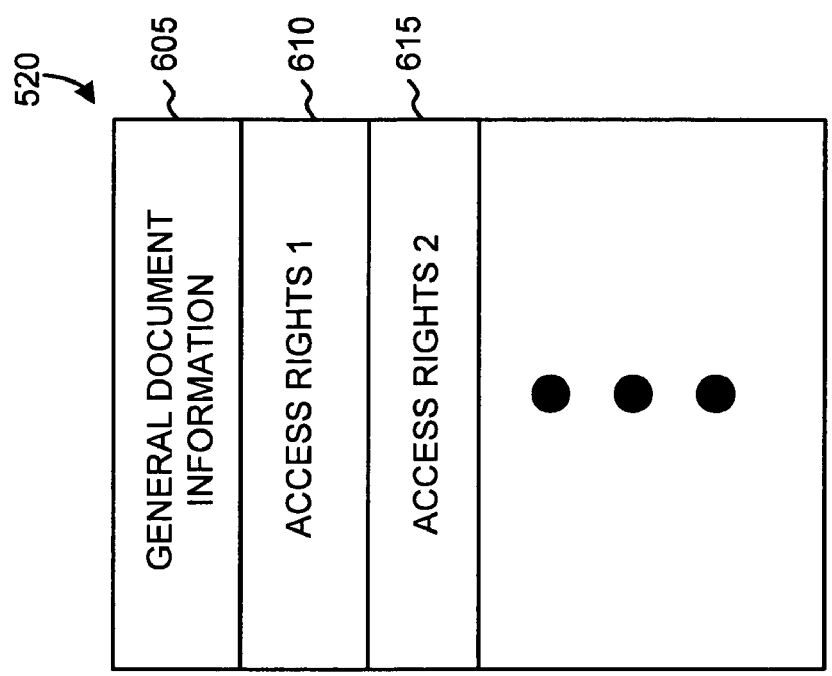
FIG. 6 is diagram illustrating an exemplary set of metadata for a document.

FIG. 6 is diagram illustrating an exemplary set of metadata 520 for a document. As mentioned, metadata 520 may include general information 605 about the document, such as, for a book, an ISBN, the publisher, author biographical information, etc. Metadata 520 may also include a number of fields relating to access privileges associated with the document. The access rights may vary by geographical location, such as by country or jurisdiction. For example, access right 610 may apply to readers in the United States and may indicate that such readers have a first set of access rights. Access rights 615 may apply to readers in Canada and may indicate that such readers have a second set of access rights. For example, readers from the United States may be given "partial" access to the document while readers in Canada may be given "full" access to the document. This may be because the content provider has been granted full rights in the document from the publisher for Canadian readers but has not been granted rights in the United States, so the content provider may choose to only enable fair use display for readers in the United States.

More generally, metadata 520 may include additional information relating to display rights granted from the publisher/content source to the content provider. Examples of such additional information include an indication of whether images or photos should be blocked in documents, a list of domains from which advertisements should not be used, a reference to a logo or link that should be displayed with the document, whether advertisements should be displayed, information defining a "buy the book" link from which the user can purchase a copy of the document, or information defining a link to promotional material. This additional information may be used when formatting the document for presentation to the user.

Additionally, different display standards may be applied to readers in different geographies. For instance, both readers in Canada and the United States may have display ability based on legal or other criteria, but the limited display ability in the two countries may be different. One of ordinary skill in the art will recognize that the various display types available to the users in different locations can be specified for a particular document or a group of documents in a number of different ways. Storing the access rights, which translate into display types, in fields 610 and 615, as described above, is one exemplary technique.

Figure 7:
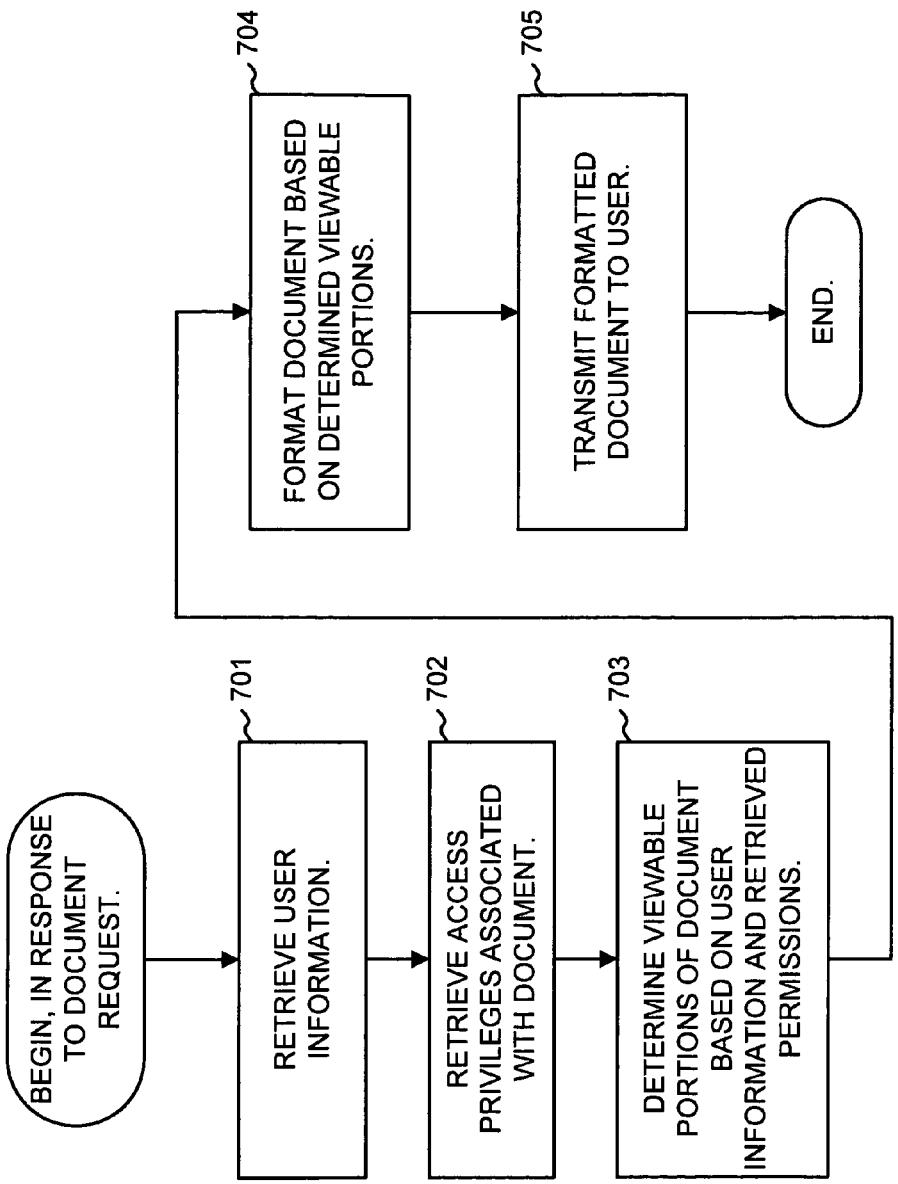
FIG. 7 is a flow chart illustrating exemplary operations of the document browsing component shown in FIG. 2.

FIG. 7 is a flow chart illustrating exemplary operations of document browsing component 225. The operations of FIG. 7 may begin whenever a user requests a document. A document may be requested, for example, pursuant to a keyword search of a corpus of indexed documents or pursuant to a user request for a specific document.

User information may be determined (act 701). In one implementation, the user information may include the location of the user. The user's location may be determined based on the Internet Protocol (IP) address associated with the user. Alternately, the domain that is being browsed may be used to determine the location. Information other than, or in addition to, the user location may also be used as user information. For example, whether the user accepts cookies may be determined and included as part of the user information. Other user security or state information may also be used. For example, registered users that have successfully logged-on may be eligible to view different portions of a document than non-registered users.

The access rights associated with the document may also be retrieved (act 702). As previously discussed, the access rights may be stored as metadata in database 405. Based on the user information and the access rights associated with the document, decision component 410 may determine what portions of the document are eligible to be shown to the particular user (act 703). The user information and the access rights associated with the document may be thought of as forming permission matrix 110 (FIG. 1), which defines the access privileges that can be granted to the user for the requested document. In some implementations, the content of the document itself may be taken into consideration when determining the access privileges that can be granted to the user. For example, fair use display for a book may be chosen to be a number of paragraphs or pages of text, while the fair use display for a short poem may be chosen to be only a line or two from the poem.

The portions of the document that can be shown to the user may then be appropriately formatted and transmitted to the user (acts 704 and 705). This formatting can be performed in a number of ways. For example, for a given document, multiple versions of the document, each including a select subset of the document, may be pre-formatted and stored. The appropriate version may then be selected and transmitted to the user in acts 704 and 705. Alternatively, the formatting can be performed on the fly. The formatting can, for instance, be a "smart" formatting in which portions of the document that are most relevant to the user (such as portions that include terms of a search query) are selected and formatted for presentation to the user.

In some implementations, photographs contained in the documents may be given special attention when formatting and transmitting the documents to the user. For example, the content source of the document may give permission to display the text of a document but not photographs in the document. The photographs may be individually obscured or deleted from the document.

FIG. 8 is a diagram of an exemplary document interface 800 presented to a user that requests a document for which full access privileges were determined in acts 701-703. In this case, the document is the first page of the book "The Adventures of Huckleberry Finn," by Mark Twain. This book is in the public domain and may, thus, be freely shown to users requesting the book. The document interface may be presented using a web browser or other viewing software at clients 210. In the example shown in FIG. 8, the interface includes a page image of the first page of the book. Graphical buttons 810 and 815 may be provided for requesting the previous page and the next page, respectively, of the book. An exemplary set of other navigation controls 830 may also be provided in interface 800. As shown, these controls 830 include links to take the user to the front cover, table of contents (TOC), back cover, or to a specified page of the document.

FIG. 9 is a diagram of an exemplary document interface 900 presented to a user that requests a document for which less than full access privileges ("partial access privileges") were determined. In this example, the document is a book that includes speeches of famous persons. Assume that based on the user's country, the fact that client 210 corresponding to the user accepts cookies, and the rights granted by the content source of the book, document browsing component 225 determines that the user is permitted to view up to 75 percent of any page in the document. Document browsing component may enforce this restriction in a number of ways. For example, as shown, the formatted image returned to the user may include portions, such as portion 905, that are blurred, blocked, or otherwise not readable. Navigation controls 930, similar to navigation controls 830, may additionally be provided to assist the user in navigating through the document.

One of ordinary skill in the art will recognize that "partial access" for a document can be provided in numerous ways in addition to that shown in FIG. 9. For example: in a specified time period (e.g., 24 hours) the user may only be permitted to view a certain portion (e.g., 10%) of the document; only pre-designated portions of the document may be viewable; the document may be stamped or watermarked with lettering such as "copyrighted"; etc. Different "partial access" interfaces may be presented to different users based on their location, other user specific information, and based on access privileges for the requested document.

FIG. 10 is a diagram of an exemplary document interface 1000 for which a user has even less access privileges than those of FIG. 9 ("restricted access"). A restricted access user may be one in which the document and user information dictates that only minimal access to the document may be given, such as a document in which only fair use rights are allowed. In this example, assume the user is performing a keyword search for the word "memory" in a hypothetical book "Harnessing the Rage." Images of select portions of three pages are shown that include hits for this term, pages 5, 15, and 28. From each page, a small snippet of text 1040 is presented to the user, showing the keyword in the context of the page.

The exemplary interfaces shown in FIGS. 8-10 illustrate an exemplary spectrum of possible document access privileges that may be granted to a user based on user specific information and general access rights of the document. Although three discrete steps in the spectrum were shown, in general, the spectrum of possible access rights can be conceptualized as a continuous one ranging from full access to restricted or no access.

Exemplary Implementation

Figure 11:
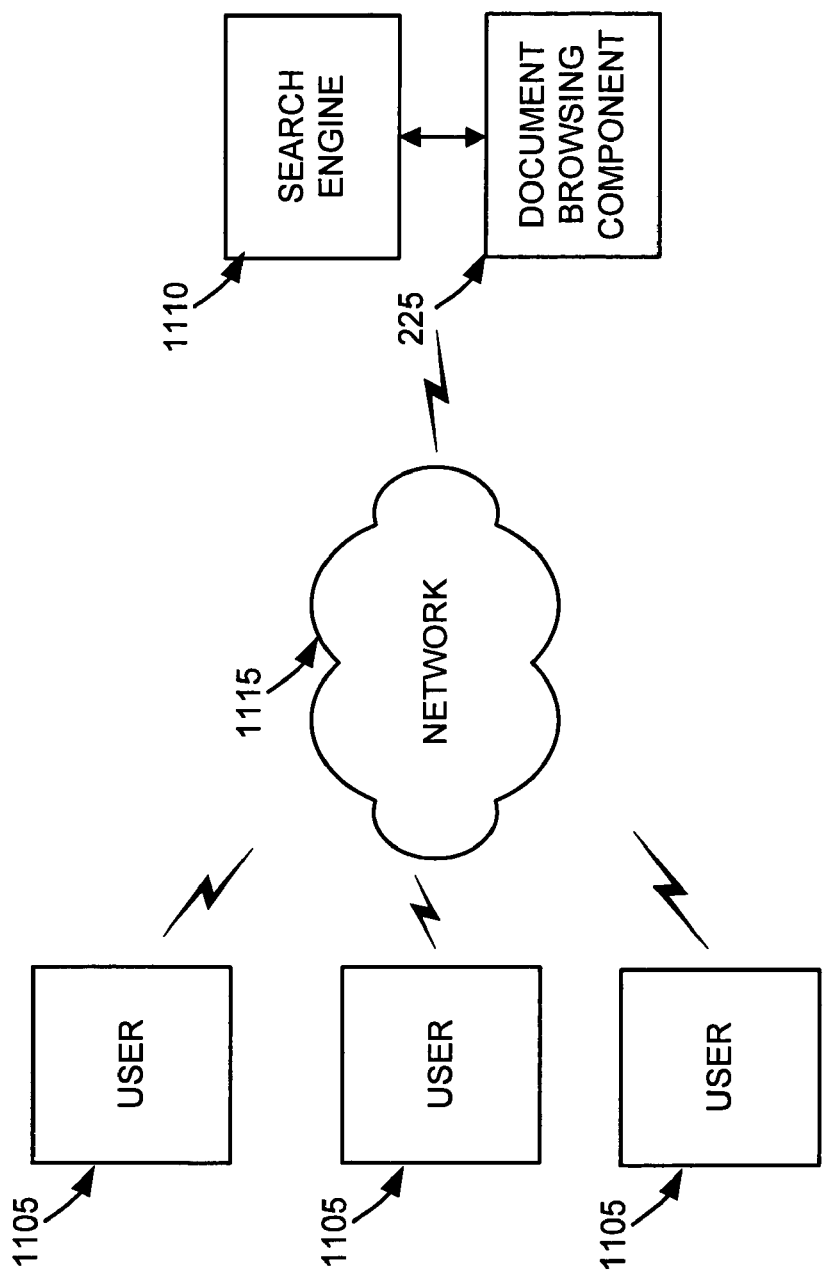
FIG. 11 is a diagram illustrating an exemplary implementation of document browsing component implemented in the context of a printed-material search engine.

FIG. 11 is a diagram illustrating an exemplary implementation of document browsing component 225 implemented in the context of a printed-material search engine. A number of users 1105 may connect to a search engine 1110 over a network 1115, such as the Internet. Search engine 1110 may be a search engine that returns links to a ranked set of documents, from a database, that are related to a user query.

The user may select one of the returned document links for viewing. In response, document browsing component 225 may perform the acts described with regard to FIG. 7 to, thus, allow the user to view the requested document to the extent permitted by the user's information and by the access privileges corresponding to the requested document.

CONCLUSION

Various techniques, as described above, are used to present different user interfaces to documents based on the access privileges determined for the documents.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders. Also, the graphical user interfaces shown above are exemplary. Other graphical designs or layouts could be used to accomplish same or like functionality.

No element, act, or instruction used in the present application should be construed as critical or essential to the invention unless explicitly described as such. Also, as used herein, the article "a" is intended to potentially allow for one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:

1. A system comprising:
one or more devices to implement:
means for receiving a search query from a user;
means for selecting a document that includes terms from the search query;
means for determining access privileges to the document for the user based on geographical location information of the user, access rights associated with the document, and applicable copyright laws, the document access privileges being determined in a spectrum of access privileges that extends from viewable access to the entire document to viewable access to a portion of the document that is less than the entire document;
means for processing selected portions of one or more sections of the document determined to be relevant to the user to make the selected portions unreadable to the user, the selected portions of the one or more sections of the document being chosen based on the determined access privileges and where the one or more sections of the document include the terms from the search query;
means for retrieving additional information relating to the access rights, where the additional information comprises at least one of:
whether to block images and graphics in the document from being displayed,
a list of domains from which not to display advertisements with the document,
a logo or a link to be displayed with the document, or
whether to display advertisements with the document;
means for formatting the document based on the additional information; and
means for transmitting the processed and formatted document to the user.

2. The system of claim 1, where one of the selected portions of the document is processed to display five or less lines of text from a page of the document.

3. The system of claim 1, where the link to be displayed with the document is one of a link to buy the document or a link to promotional material associated with the document.

4. A method performed by a computer system, the method comprising:
retrieving, using one or more processors associated with the computer system, information relating to a user;
receiving, by a communication interface of the computer system, a request for a document from the user;
retrieving, using one or more processors associated with the computer system, access rights for the document, the access rights defining legal display rights of a content provider to display the document;
selecting, using one or more processors associated with the computer system, access privileges to the document for the user based on the information relating to the user and based on the access rights for the document;
processing, using one or more processors associated with the computer system, selected portions of the document, for display to the user, to be unreadable to the user, the selected portions being chosen based on the determined access privileges;
selecting, using one or more processors associated with the computer system, additional information relating to the access rights, where the additional information comprises at least one of:
whether to block images and graphics in the document from being displayed,
a list of domains from which not to display advertisements with the document,
a logo or a link to be displayed with the document, or
whether to display advertisements with the document;
formatting, using one or more processors associated with the computer system, the document based on the additional information; and
transmitting, using a communication interface associated with the computer system, the formatted document to the user for display to the user.

5. The method of claim 4, where the document represents a scanned version of a document.

6. The method of claim 4, where the document represents a book or magazine.

7. The method of claim 4, where the document access privileges are determined in a spectrum of access privileges that extends from fill access to the document to restricted access to the document.

8. The method of claim 7, where the access privileges to the document is specified by standards of an area in which the user is determined to be located.

9. The method of claim 4, where the selected portions of the document include images of pages of the document.

10. The method of claim 9, where the selected portions of the document includes machine-readable text.

11. The method of claim 10, where the document includes metadata relating to the document, the metadata including the access rights associated with the document.

12. The method of claim 4, where the access privileges are further determined by a content of the document.

13. The method of claim 4, where the retrieved information relating to a user includes a security status of the user.

14. The method of claim 4, where the access rights defining the legal display rights define less than full display rights for the document.

15. The method of claim 4, where the information relating to the user includes a location of the user.

16. The method of claim 15, where the location information is determined from an Internet Protocol (IP) address associated with the user.

17. The method of claim 15, where the location information is determined based on a domain of a network site being visited by the user.

18. The method of claim 15, where the location information of the user and the access rights associated with the document are used to determine the access privileges to the document as a function of applicable copyright laws.

19. The method of claim 4, further comprising:
receiving a keyword from the user; and
where the selected portions of the document comprise an instance of the keyword.

20. One or more memory devices containing processing instructions executable by one or more processors, the processing instructions comprising:
one or more instructions to retrieve information relating to a user;
one or more instructions to receive a request for a document from the user;
one or more instructions to retrieve access rights for the document, the access rights defining legal display rights of a content provider to display the document;
one or more instructions to select access privileges to the document for the user based on the information relating to the user and based on the access rights for the document;
one or more instructions to process selected portions of the document, for display to the user, to be unreadable to the user, the selected portions being chosen based on the determined access privileges;
one or more instructions to select additional information relating to the access rights, where the additional information comprises at least one of:
whether to block images and graphics in the document from being displayed,
a list of domains from which not to display advertisements with the document,
a logo or a link to be displayed with the document, or
whether to display advertisements with the document;
one or more instructions to format the document based on the additional information; and
one or more instructions to transmit the processed and formatted document to the user for display to the user.

21. The one or more memory devices of claim 20, where the access rights defining the legal display rights define less than full display rights for the document.

22. The one or more memory devices of claim 20, where the link to be displayed with the document is one of a link to buy the document or a link to promotional material associated with the document.

* * * * *